Nov. 11, 1969 J. V. WATSON 3,477,746
MULTILINE SWIVEL AND MOUNTING SYSTEM
Filed Oct. 3, 1967 2 Sheets-Sheet 1

INVENTOR
John V. Watson
BY Wofford & Felsman
ATTORNEYS

Nov. 11, 1969   J. V. WATSON   3,477,746
MULTILINE SWIVEL AND MOUNTING SYSTEM
Filed Oct. 3, 1967   2 Sheets-Sheet 2

INVENTOR
John V. Watson
BY Wofford & Felsman
ATTORNEYS

United States Patent Office 3,477,746
Patented Nov. 11, 1969

3,477,746
MULTILINE SWIVEL AND MOUNTING SYSTEM
John V. Watson, Fort Worth, Tex., assignor to Watson Manufacturing Company, Fort Worth, Tex.
Filed Oct. 3, 1967, Ser. No. 672,587
Int. Cl. F16l 39/00, 5/00, 27/00, 4/00
U.S. Cl. 285—119                          2 Claims

ABSTRACT OF THE DISCLOSURE

Following is disclosed a multiline swivel and mounting system especially suitable for earth working equipment and the like in which hydraulic fluid must be transmitted between a mobile carriage and a rotatable turret. The swivel, having a plurality of separate flow channels, is mounted on the platform with a flange and fasteners which secure a cylindrical core in a stationary position relative to the platform. A cylindrical sleeve rotatably surrounds the core, with its top surface terminating below the core, and a removable fastener such as a snap ring disposed in an annular groove in the core above the sleeve prevents upward movement of the sleeve. Flow channels in the core and the sleeve communicate with hydraulic lines in the platform and the turret. A torque rod extends between a torque arm on the rotatable sleeve and a rotatable turret.

Background and general discussion

In earth working equipment having hydraulic systems, it is frequently necessary to transmit fluid between a mobile carriage or platform and a rotatable turret. Swivels having a plurality of separate flow channels have been developed previously for this purpose, but those with which I am familiar and their mounting systems have a number of significant disadvantages. Some swivels and their mounting systems require critical alignment between the core mounting means and the sleeve mounting means. Failure to achieve proper alignment may result in premature wear and failure. Another significant disadvantage common to previously known devices is the difficulty in assembly and disassembly. It is advantageous that the core and sleeve of the swivel and their mounting means be readily accessible and easily assembled and disassembled for maintenance purposes.

It is, therefore, my purpose to provide hydraulic swivel and mounting means especially suitable for use in earth working equipment, being readily accessible, easily assembled and disassembled, without necessity for critical alignment, thereby minimizing possibility of premature failure resulting from wear and stresses caused by misalignment.

Description of a preferred embodiment

Figure 1:
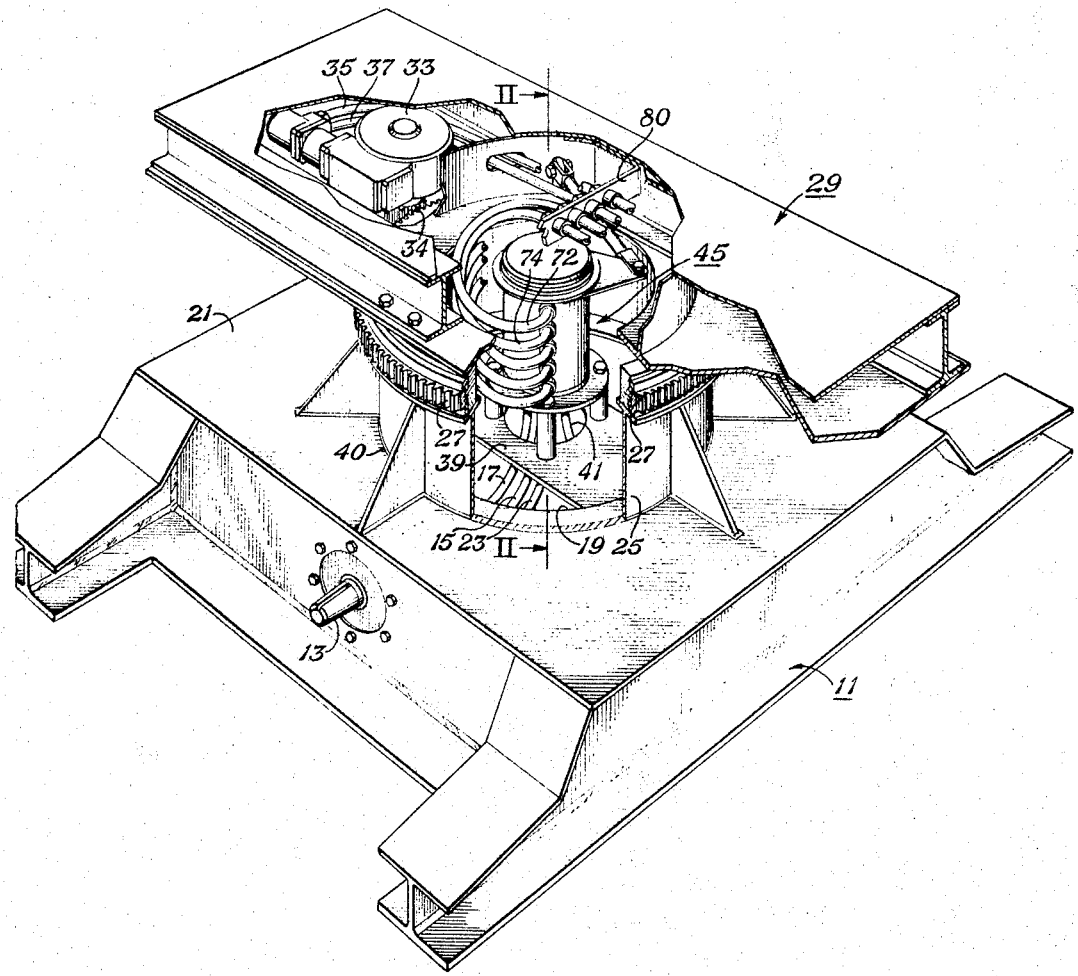
FIG. 1 is a perspective view of a stationary platform and rotatable turret of the type that may be used in earth moving equipment which includes a multiline swivel and mounting means constructed in accordance with the principles of my invention.

The numeral 11 in the drawing designates a platform which may have a variety of forms suitable for use in equipment such as that used in earth working. The platform may, for example, have an output shaft 13 extending from each of two opposite sides, each being powered by a hydraulic motor (not shown) disclosed in my copending application entitled "Hydraulic Control Systems for Crawlers," Ser. No. 672,523, filed Oct. 3, 1967. Each such hydraulic motor will normally have two input lines 15, 17 which are visible in FIG. 1 through a circular aperture 19 formed in a horizontal plate 21 of the platform 11. Fluid may be selectively pumped through either input line 15 and 17 of the hydraulic motor and out the other to drive the motor in either direction. Another line 23 drains lubricating oil to a common tank. Line 23 may be a common line to a number of motors.

Figure 2:
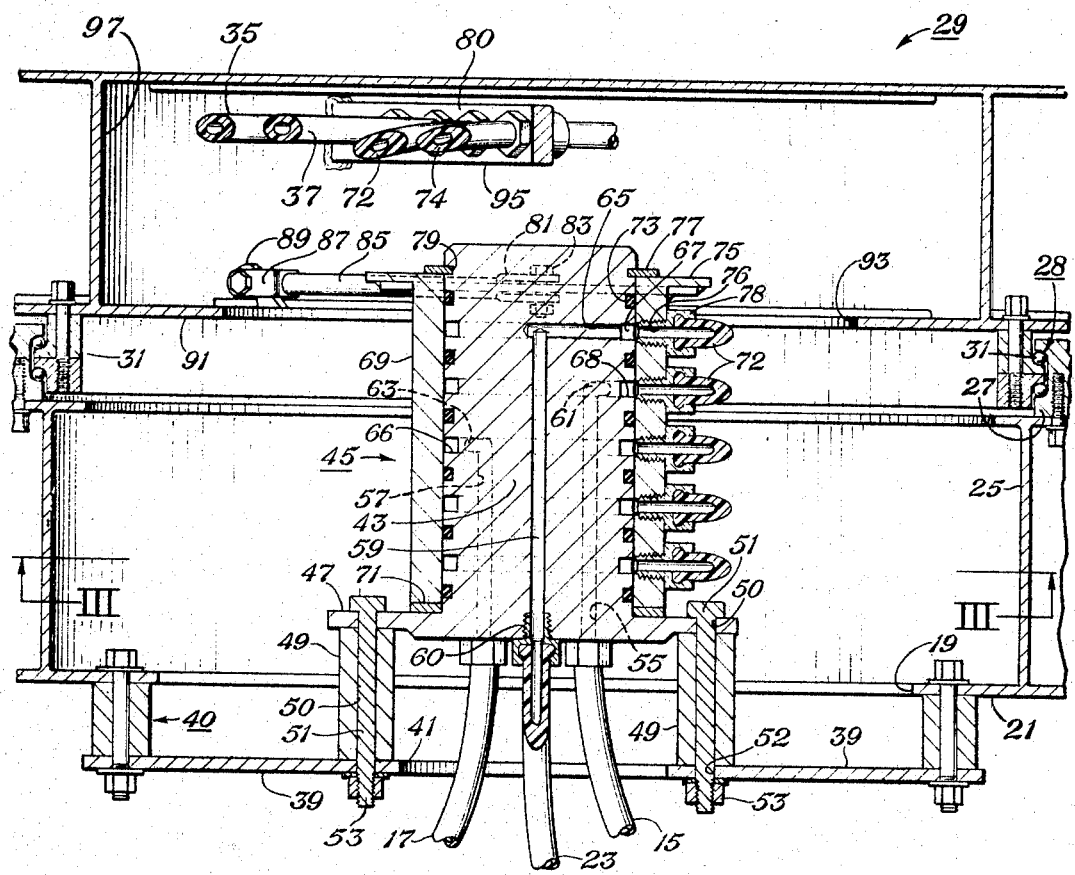
FIG. 2 is a cross sectional view as seen looking along the lines of II—II of FIG. 1.

Aperture 19 is enclosed above plate 21 by a vertically extending cylindrical wall 25 upon which a bull gear 27 is secured by suitable bearing and retainer means 28 as shown in FIG. 2. A rotatable turret 29 is secured on top of bull gear 27, having as seen in FIG. 2, bearings 31 to reduce friction. A reversible hydraulic motor 33 and pinion 34 (see FIG. 1) are secured to the turret 29, being connected with suitable hydraulic lines (such as those indicated by numerals 35 and 37) which extend to a hydraulic fluid source (not shown) mounted on or above the turret.

A horizontal plate 39 having a central aperture 41 extends across the aperture 19 of horizontal plate 21 on platform 11, being secured in that position by suitable means such as the pedestals and fasteners 40. The core 43 (see FIG. 2) of a multiline swivel 45 has a flange 47 extending radially outward from its lower region, being supported by a plurality of tubular pedestals 49 which receive in apertures 50 a plurality of bolts 51 that extend through apertures 52 in the plate 39 to receive fasteners 53 as shown in FIG. 2. The hydraulic lines 15, 17 and 23 extending through the aperture 41 of the plate 39 communicate with respective axial ports 55, 57 and 59 (see FIG. 2). Conventional fasteners 60 are used to secure the hydraulic lines to the core 43. Each axial port extends upward through the core 43 into communication with a selected radial port 61, 63, and 65. Also, each radial port communicates with a selected annular groove 66, 67 or 68. A rotatable sleeve 69 is assembled around core 43, resting in this instance on a suitable friction reducing element such as bronze bushing 71 supported by flange 47 of the core. Hydraulic lines 72 are secured by fasteners 76 inserted into drilled holes in rotatable sleeve 69 that form additional radial ports 78, each of which communicates with one of the annular grooves in the core 43. The hydraulic lines 72, 74 extend upward into the turret 29, being supported by the bracket 80. The axial ports 55, 57 and 59; the radial ports 61, 63 and 65; the annular grooves 66, 67 and 68; and the additional radial ports 78 of fasteners 76 are referred to subsequently as "flow channels" of the multiline swivel.

Sealing means such as O-rings 73 in suitable grooves on each side of the annular grooves prevent the fluid leakage between core and sleeve. The core 43 has a length such that an upper portion extends beyond the upper horizontal surface 75 of the rotatable sleeve 69. To removably establish the position of rotatable sleeve 69 relative to core 43, a movable retainer means such as the snap ring 77 is inserted in a groove 79 such that the lower surface of the retainer means engages the upper surface 75.

Figure 3:
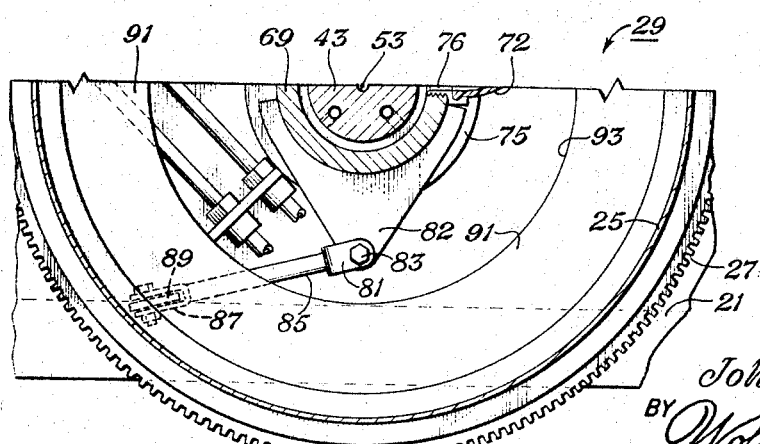
FIG. 3 is a cross selectional view as seen looking along the lines III—III of FIG. 2.

Upper surface 75 may be considered a radially extending shoulder having one portion protruding outward to form a torque arm as indicated by the numeral 82 in FIG. 3. A clevis 81 is connected with the torque arm 82, being secured in that position by a suitable fastener 83. A torque rod 85 has one end secured to clevis 81 and its opposite end to another clevis 87 connected to a protrusion 89 on a horizontal plate 91 of the rotatable turret 29. The plate 91 has an aperture 93 through which a portion of the multiline swivel 45 extends.

In operation fluid may flow through one of the hydraulic lines 72, through one of the previously described flow channels in the multiline swivel 45, and through one of the inlet lines 15, 17 to the hydraulic motor (not shown) that drives shaft 13, being returned through drain line 23. Since the sleeve 69 of the swivel is rotatable relative to the core 43, turret 29 rotation is effected through actuation of the hydraulic motor 33 and pinion 34. The torque rod 85, being connected with the turret 29 and the sleeve 69 through torque arm 82 rotates the sleeve. Consequently, unrestricted and continuous rotation of the turret is permitted while enabling separate control over the flow through each of the flow channels.

It should be apparent from the foregoing that I have provided an invention having significant advantages. Alignment of components to obtain correct relationship between the rotatable sleeve 69 and the stationary core 43 is significantly simplified. Typically, the tubular pedestals 49 are positioned on the horizontal plate 39 and welded into position. The sleeve 69 may be easily installed on the core 43 of the swivel since the torque rod 85 enables oscillation and eccentric location of the swivel relative to the turret. The use of such a mounting system enables quick assembly and disassembly. Moreover, the utilization of the removable fastener means 77 to secure the sleeve 69 in position on the core 43 of the swivel 45 permits quick assembly and disassembly of the rotatable sleeve and simplifies subsequent maintenance. The utilization of a simple bearing means such as the bronze bushing 71 in combination with the removable fastener means 77 produces a rugged and reliable structure; one which may be easily maintained.

While I have shown my invention in only one of its forms it should be apparent to those skilled in the art that it is not so limited but is susceptible to various changes and modifications without departing from the spirit thereof.

What is claimed is:

1. A multiline swivel and mounting system especially suitable for earth working equipment comprising:
   a platform;
   a cylindrical multiline swivel core carried by said platform;
   a cylindrical sleeve rotatably secured to said core, with the top surface of the core extending beyond the top surface of said sleeve;
   removable retainer means secured to said core and said sleeve to limit relative axial movement between them;
   said core and sleeve having a plurality of sealed flow channels with portions thereof spaced axially along the engaging cylindrical surfaces, said flow channels including radial ports extending through said sleeve into communication with selected channels, and axial ports extending through said core into communication with selected channels;
   a torque arm extending from an upper region of said sleeve;
   a torque rod secured to said torque arm;
   a rotatable turret secured to said torque rod;
   a bull gear secured to said platform and circumscribing said core and sleeve;
   a motor carried by the rotatable turret;
   a plurality of lines secured to said sleeve and communicating with selected sealed flow channels between the sleeve and core; and
   a pinion secured to said motor and engaging said bull gear.

2. A multiline swivel and mounting system especially suitable for earth working equipment comprising:
   a platform;
   a flange mounted to said platform;
   a cylindrical multiline swivel core rigidly secured to said flange and extending upward therefrom;
   a cylindrical sleeve rotatably secured to said core, with the top surface of the core extending beyond the top surface of said sleeve;
   removable retainer means secured to the exterior surface of the core above the top surface of said sleeve to engage said sleeve and limit relative axial movement between the sleeve and the core;
   said core and sleeve having a plurality of sealed flow channels with portions thereof spaced axially along the engaging cylindrical surfaces, said flow channels including radial ports extending through said sleeve into communication with selected channels, and axial ports extending through said core into communication with selected channels;
   a torque arm extending from an upper region of said sleeve;
   a torque rod secured to said torque arm;
   a rotatable turret secured to said torque rod; and
   a bull gear secured to said platform and circumscribing said core and sleeve;
   a motor carried by said rotatable turret;
   a plurality of lines secured to said sleeve and communicating with selected sealed flow channels between the sleeve and core; and
   a pinion secured to said motor and engaging said bull gear.

References Cited

UNITED STATES PATENTS

| | | | |
|---|---|---|---|
| 2,577,858 | 12/1951 | Sampson | 285—136 X |
| 2,662,785 | 12/1953 | Fawick | 285—136 |
| 2,781,134 | 2/1957 | Weir et al. | 285—136 X |
| 3,181,898 | 5/1965 | Brown | 285—190 X |
| 3,229,815 | 1/1966 | Mathewson | 285—190 X |

THOMAS F. CALLAGHAN, Primary Examiner

U.S. Cl. X.R.

212—68; 285—136, 190